(12) United States Patent
Jeong

(10) Patent No.: US 8,081,142 B2
(45) Date of Patent: Dec. 20, 2011

(54) MEMORY CIRCUIT FOR DISPLAY PANEL DRIVING AND DRIVING METHOD THEREOF

(75) Inventor: Seong Ik Jeong, Seoul (KR)

(73) Assignee: Syncoam Co., Ltd., Seongnam-si, Gyeonggi-do (KR)

( * ) Notice: Subject to any disclaimer, the term of this patent is extended or adjusted under 35 U.S.C. 154(b) by 1142 days.

(21) Appl. No.: 10/560,920

(22) PCT Filed: Sep. 4, 2003

(86) PCT No.: PCT/KR03/01813
§ 371 (c)(1),
(2), (4) Date: Apr. 10, 2007

(87) PCT Pub. No.: WO2004/114269
PCT Pub. Date: Dec. 29, 2004

(65) Prior Publication Data
US 2008/0129651 A1 Jun. 5, 2008

(30) Foreign Application Priority Data
Jun. 23, 2003 (KR) .................. 10-2003-0040538

(51) Int. Cl.
*G09G 3/20* (2006.01)
(52) U.S. Cl. ..................... 345/55; 365/189.05
(58) Field of Classification Search .............. 345/55, 345/100; 365/189, 230, 233.12
See application file for complete search history.

(56) References Cited

U.S. PATENT DOCUMENTS

| | | | | |
|---|---|---|---|---|
| 5,103,218 | A | * | 4/1992 | Takeda ........................ 345/100 |
| 6,301,191 | B1 | * | 10/2001 | Ooishi ...................... 365/233.12 |
| 6,437,768 | B1 | * | 8/2002 | Kubota et al. ................. 345/100 |
| 2001/0043187 | A1 | * | 11/2001 | Ikeda .......................... 345/100 |

FOREIGN PATENT DOCUMENTS

| | | |
|---|---|---|
| JP | 59-20027 | 2/1984 |
| JP | 2003-8424 | 1/2003 |
| KR | 2001-0047531 | 6/2001 |

OTHER PUBLICATIONS

PCT International Search Report; PCT/KR03/01813; Date of mailing: Oct. 29, 2003.
PCT International Preliminary Examination Report; PCT/KR2003/001813; Dated: Sep. 26, 2005.
"A 21ns 32K×8 CMOS Static RAM With a Selectively Pumped p-Well Array"; Authors: Karl L. Wang, Mark D. Bader, Vince W. Soorholtz, Richard W. Mauntel, Horacio J. Mendez, Peter H. Voss, Roger I. Kung; IEEE Journal of Solid-State Circuits, vol. sc-22, No. 5, Oct. 1987; pp. 704-711.

* cited by examiner

*Primary Examiner* — Quan-Zhen Wang
*Assistant Examiner* — Yuk Chow
(74) *Attorney, Agent, or Firm* — Kile Park Goekjian Reed & McManus PLLC

(57) ABSTRACT

Provided is a circuit driving method which can minimize a problem generated by a peak current in a display memory device. Data to be transferred to a display panel is read out from a memory cell array storing binary information. The read-out data are stored in source data buffers and a plurality of source data buffers are divided into several groups and then enabled. An enable signal for each group is derived from a single enable signal and has a different delay time. In the source data buffers delayed by each group and enabled, consumption of current is distributed so that a peak current flowing in the overall source data buffer is lowered. Thus, reliability in the operation of a circuit is improved and the operation speed increases.

30 Claims, 6 Drawing Sheets

MEMORY CIRCUIT FOR DISPLAY PANEL DRIVING AND DRIVING METHOD THEREOF

TECHNICAL FIELD

The present invention relates to a display memory device, and more particularly, to a circuit technology concerning the control of a data buffer for temporarily storing data which is transmitted from a memory cell array when an image is displayed by providing image data to a display panel.

BACKGROUND ART

Recently, new flat panel display technologies replacing cathode ray tubes are adopted in portable communication apparatuses, notebooks, and mid or large terminals. Along those apparatuses, LCDs (liquid crystal displays) are mostly used for monitors of the mid or large terminals such as notebooks. LCD monitors are competitive in terms of resolution, color display, image quality, and low power consumption, compared to other display devices. Meanwhile, organic electroluminescence devices (hereinafter, referred to as "organic EL") exhibit superior characteristics in brightness, angle of view, response speed, and power consumption, compared to TFT-LCDs. In particular, the fast response speed of the organic EL than other display devices is suitable for IMT-2000 mobile phones in which motion picture is necessary. Since the organic EL uses organic compounds having a superior fluorescence or phosphorescence efficiency, it is easy to develop a substance having various band gaps through design and synthesis of molecules. Also, since it has a low manufacturing temperature, the organic EL can be manufactured on not only glass but also a plastic substrate.

In order to display image data on a display panel to which a variety of technologies are applied, pixels arranged in vertical and horizontal directions of the display panel are driven by using image data. In the panel, the horizontal length is usually greater than the vertical length so that a user can feel comfortable. However, in some cases such as a display window of a mobile phone, the vertical length is greater than the horizontal length. A circuit driving the pixels of a panel in the horizontal direction is characteristically referred to as a gate driving circuit since the circuit is usually connected to gates of transistors constituting the pixels. In contrast, a circuit driving the pixels in the vertical direction is referred to as a source driving circuit since the circuit is usually connected to sources of pixel transistors. A portion driven by the gate driving circuit is usually used to select a pixel array in the horizontal direction while the source driving circuit is usually used to access data of a selected pixel.

FIG. 1 is a block diagram of a typical display panel driving system. Referring to FIG. 1, the operation of a typical display panel driving system 100 is described.

Image data to be transferred to a display panel 110 is stored in a memory cell array portion 140 in the form of binary information. The data is written in the memory cell array portion 140 through a logic control portion 170 and a memory glue logic 180 from the outside of a driving system shown in FIG. 1. The data read from the memory cell array portion 140 is transferred to a source data buffer 130 and temporarily stored therein and then transferred to the source driving circuit 120. A gate driving circuit 150, a gate control circuit 160 and the data transferred to the source driving circuit 120 finally drive pixels of the display panels 110 so that a user can view a desired image. This conventional display driving system is generally constituted by using several semiconductor IC chips. However, with a recent trend that more number of functions are incorporated into a signal chip, the number of IC chips constituting the system is decreasing.

The way in which data is transferred from the memory cell array portion 140 to the source data buffer 130 is different from that of typical memory products, for example, a standard DRAM or SRAM. In the standard DRAM or SRAM, only the number of columns required for a single cycle are selected by a column address via a column selection gate connected to one end of a bit line, and data is input and output through the gate. In the display memory product like the present invention, however, data of the entire columns connected to the memory cell array portion 140 are simultaneously selected for a single operation cycle through another additional selection gates. The selected data is temporarily stored in the source data buffer 130. At this time, since the source data buffer 130 made of hundreds through thousands of repetitious circuits are all enabled to operate, a large amount of current is consumed.

When current is consumed for such a short time in a semiconductor chip, many unexpected effects occur. A typical unexpected effect is a ground bounce phenomenon generated due to a peak current which makes operation of a circuit unstable and delays operation time. As operation current flowing for a short time increases, that is, the current at a peak value increases, a voltage of a ground node increases proportionally. Since the above phenomenon is well know, a detailed description thereof will be omitted.

One of the conventional methods to solve the above peak current problem is to reduce a switching speed of an output circuit in a semiconductor memory product. The method is disclosed in an article entitled "A 21 ns 32 k×8 CMOS Static RAM with a Selectively Pumped P-well Array" (IEEE, J. of Solid-State Circuits, vol. SC-22 No. 5 Oct. 1987).

Also, a technology which enables a stable operation at a high frequency by providing a data bus sensing portion that is enabled with a delay time adjusted to vary by an operation mode according to a CAS latency information value in SDRAM, is disclosed in Korean Patent Publication No. 2001-0047531 (15 Jun. 2001).

However, in the conventional technologies, since data of the entire columns are not simultaneously accessed, the problem due to the peak current is not quite serious. In contrast, in the circuit exclusively designed for a display use, since data of the entire columns of the memory cell array portion are simultaneously transferred to the source data buffer, the problem due to the peak current becomes more serious.

DISCLOSURE OF THE INVENTION

To solve the above problems, it is an object of the present invention to provide a circuit driving method by which a peak current which may be generated when data is transferred in a source channel direction is minimized.

It is another object of the present invention to provide a circuit which enables a stable operation and minimizes delay of a signal by minimizing an effect by the peak current.

It is yet another object of the present invention to provide reliability of a display driving system using the circuit according to the present invention and stability of an image to be displayed, by the above driving method.

To achieve the above objective, there is provided a memory device for driving a display panel according to the present invention includes a latch type memory cell array, pairs of bit line-bit bar lines connected to memory cells, first transfer gates connected to one end of the bit line-bit bar line pairs and switched to access the memory cells, column addresses to group the first transfer gates by unit of $2^n$, wherein n is a positive integer including 0, and switch the grouped first transfer gates, second transfer gates connected to the other end of the bit line-bit bar line pairs and switched to read out the binary information stored in the memory cells, and source data buffers receiving data from the second transfer gates and temporarily storing the received data.

Preferably, signals applied to switch the second transfer gates are divided into several groups and have different time delays. Also, signals to enable the source data buffers where data transferred by the second transfer gates are temporarily stored have different delay times.

Also, signals to simultaneously enable the second transfer gates and the source data buffers are divided into several groups and have different delay time.

BEST MODE FOR CARRYING OUT THE INVENTION

Figure 1:
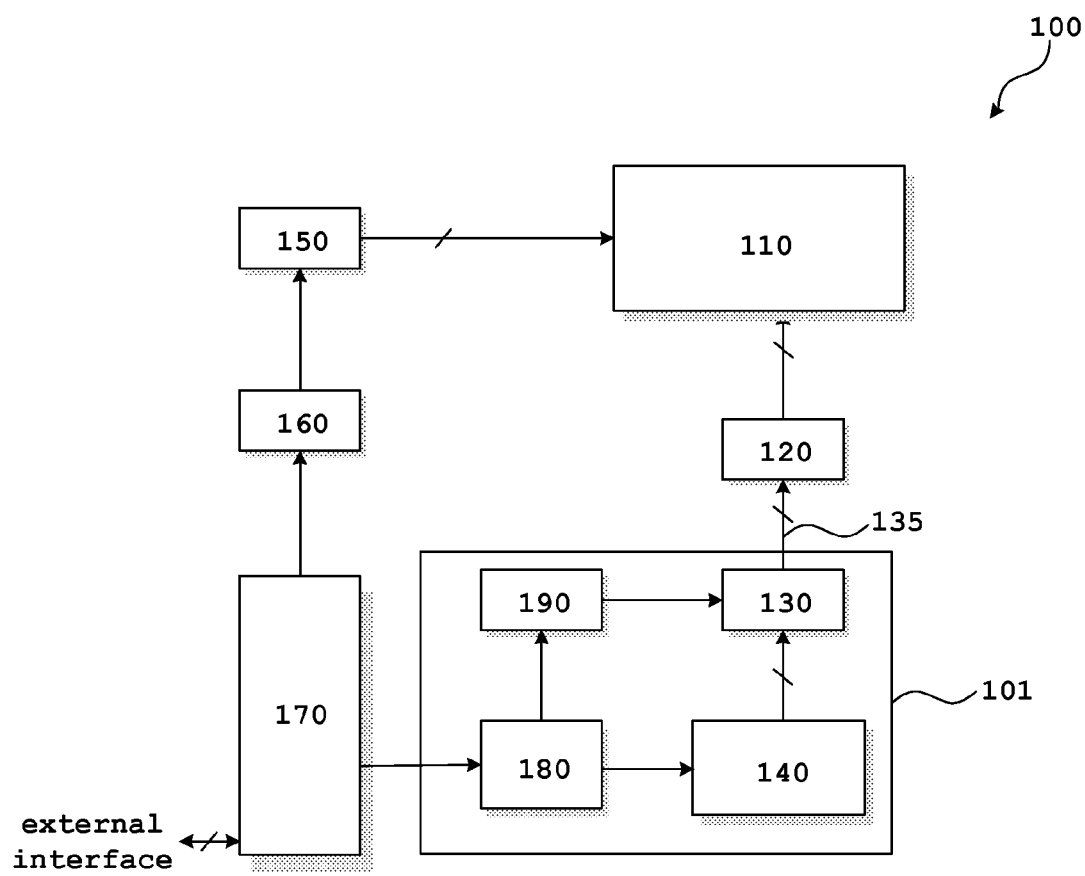
FIG. 1 is a block diagram of a typical display panel driving system.

In the following description, the same reference numerals in the drawings indicate the same constituent elements.

Figure 2:
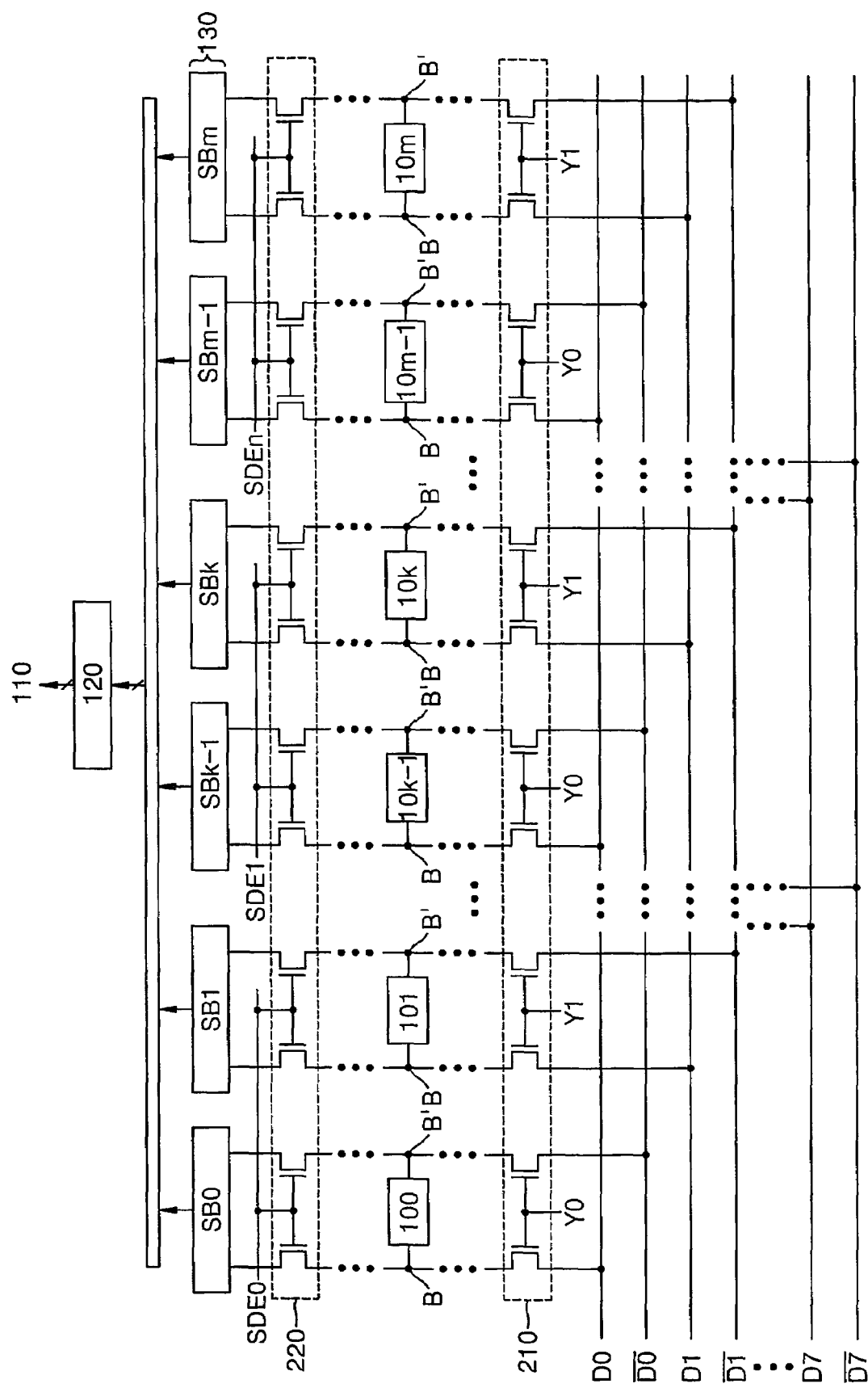
FIG. 2 is a view illustrating a memory device for driving a display panel according to a first preferred embodiment of the present invention.

FIG. 2 is a view illustrating a memory device for driving a display panel according to a first preferred embodiment of the present invention. As shown in FIG. 2, a memory device for driving a display panel according to a first preferred embodiment of the present invention includes a latch type memory cell array 100-10m for storing binary information, pairs of bit (B) line-bit bar (B') lines connected to memory cells, first transfer gates 210 connected to one end of the bit (B) line-bit bar (B') line pairs and switched to write the binary information in the memory cells, column selection signals Y0, Y1, . . . using a column address to switch the first transfer gates by grouping unit of $2^n$, wherein n is a positive integer including 0, second transfer gates 220 connected to the other end of the bit (B) line-bit bar (B') line pairs and switched to read the binary information stored in the memory cells, and source data buffer circuits SB0-SBm receiving data from the memory cell array by the switching operation of the second transfer gates and storing the same.

The binary information to be transferred to the display panel 110 is initially stored in the memory cell arrays 100-10m. The information is stored by the switching operation of the first transfer gates 210 through data lines D0-D7. Among the entire columns, only a part of the first transfer gates 210 are selected by a column address for a single operation cycle. The selection of a part of columns is made by the column address like the operation of a typical DRAM or SRAM. The stored binary information is transferred to the source data buffers 130 through the second transfer gates 220. The transfer of the source data buffers 130 is made in the entire columns for a single operation cycle.

It is noted that the difference between the typical semiconductor memory device and the memory device for driving a display panel according to the present invention lies in the presence of the second column selection gates and the source data buffers receiving data from the second column selection gates and their operations.

In the first preferred embodiment of the present invention shown in FIG. 2, each group of the second transfer gates 220 has a different delay signal to reduce the peak current consumption. The data of the columns selected by signals SDE0-SDEn which are grouped and have different time delay is transferred to the source data buffers 130 and stored therein. Thus, as the operation of the source data buffers 130 are delayed according to the delay operation of the second transfer gates 220, the above-described peak current reduction effect is obtained so that consumption of current can be distributed.

Figure 3:
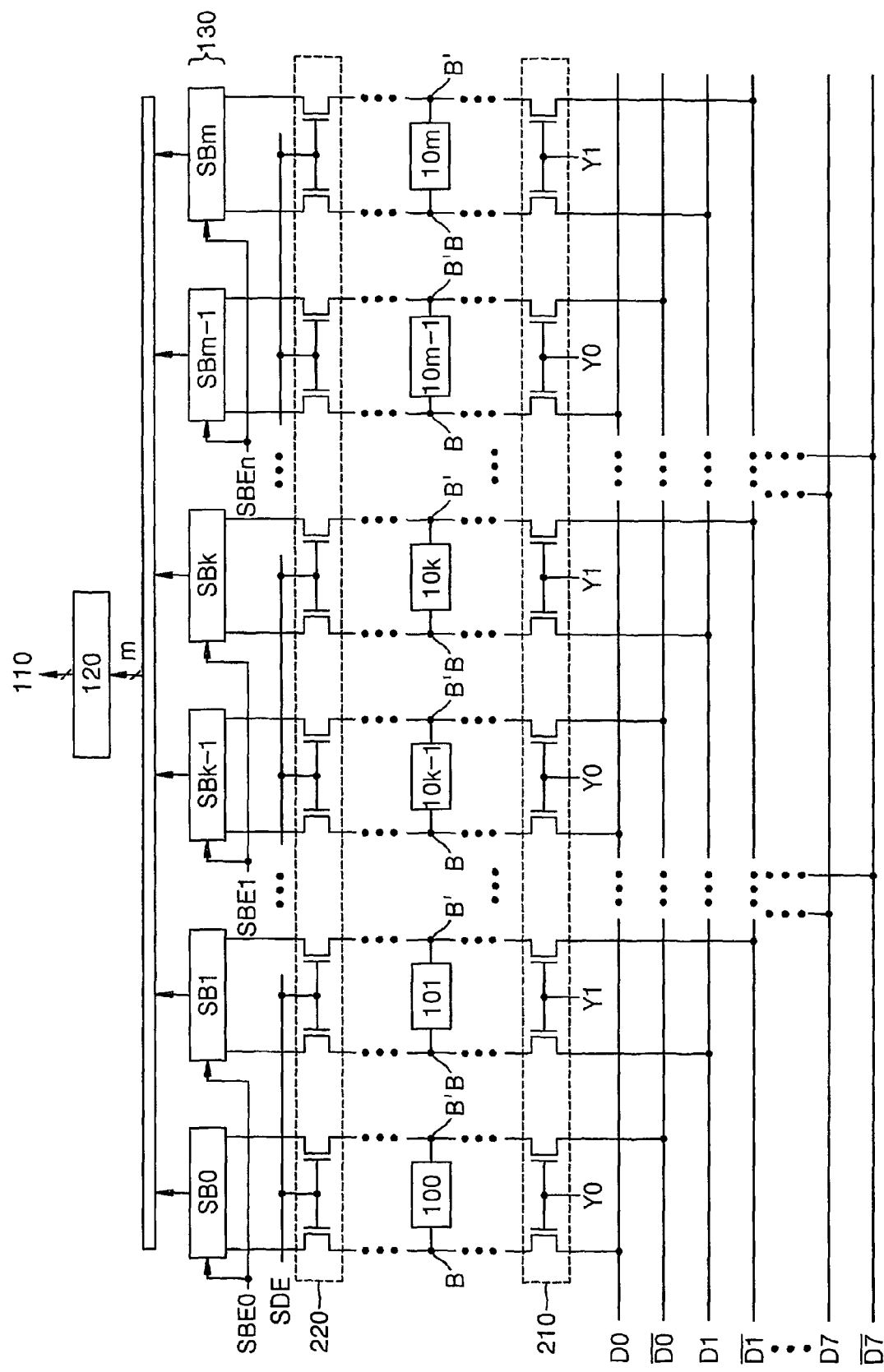
FIG. 3 is a view illustrating a memory device for driving a display panel according to a second preferred embodiment of the present invention.

FIG. 3 shows a memory device for driving a display panel according to a second preferred embodiment of the present invention. It is noted that the circuit shown in FIG. 3 is similar to the circuit shown in FIG. 2 in terms of a connection state, but they are different in the connection state of the source data buffers 130 and the second transfer gates 220. In the preferred embodiment of FIG. 3, the second transfer gates 220 transferring the information stored in the memory cell array 100-10m to the source data buffers 130 are simultaneously switched. Instead, enables signals SBE0-SBEn starting the operation of the source data buffers 130 are divided into several groups and have different time delays. Accordingly, since the source data buffer 130 circuits start operations at different times, the current consumption due to the operation of the source data buffer 130 circuits is appropriately distributed so that the above-described peak current reduction effect can be obtained.

Figure 4:
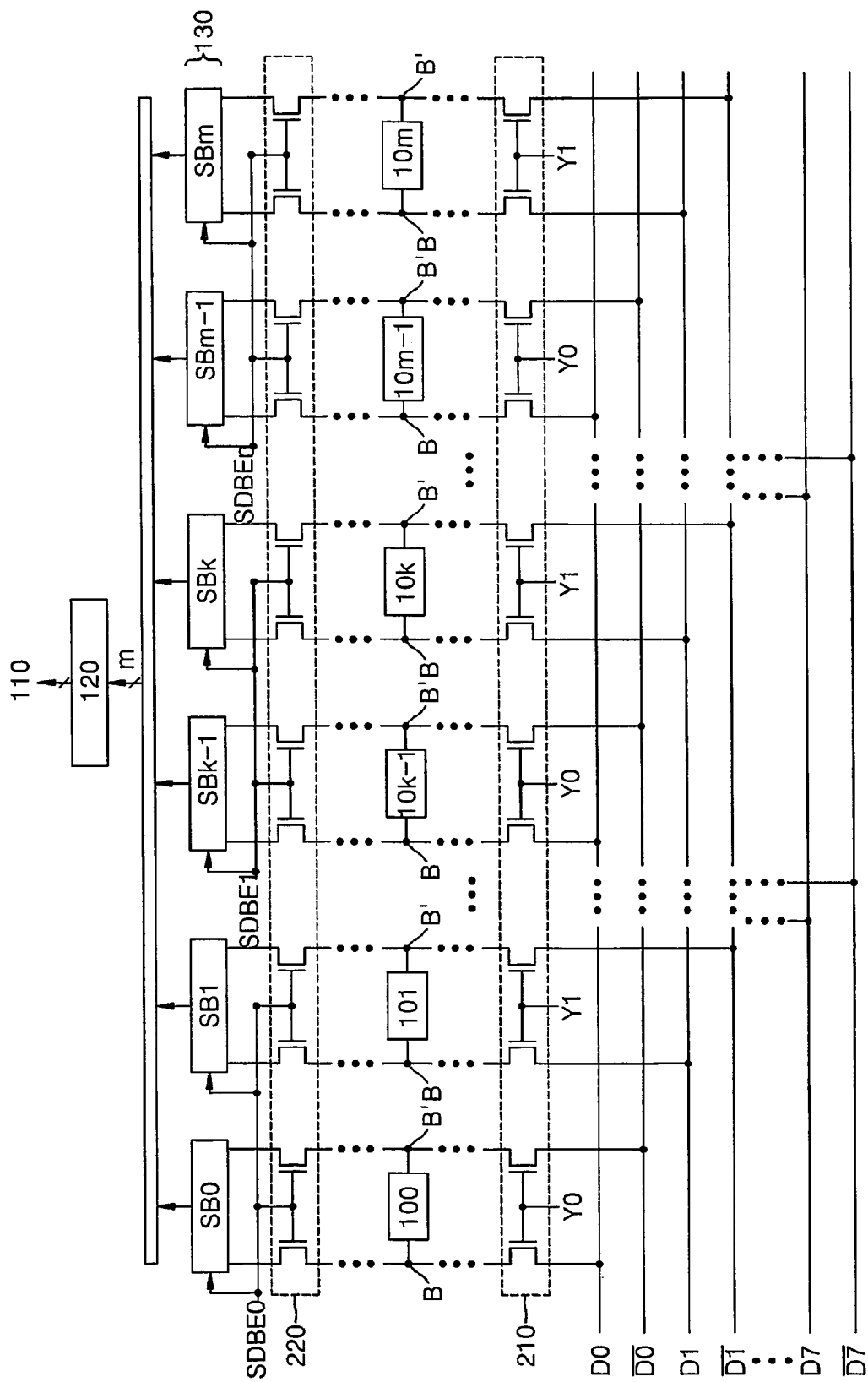
FIG. 4 is a view illustrating a memory device for driving a display panel according to a third preferred embodiment of the present invention.

FIG. 4 shows a memory device for driving a display panel according to a third preferred embodiment of the present invention. It is noted that the circuit shown in FIG. 4 is similar to the circuits shown in FIGS. 2 and 3 in terms of a connection state, but they are different in the state of signals connected to the source data buffers 130 and the second transfer gates 220. In the preferred embodiment of FIG. 4, the second transfer gates 220 and the source data buffers 130 are divided into several groups and simultaneously switched by groups. Signals SDBE0-SDBEn enabling the respective groups have different time delays. Accordingly, since the source data buffers 130 circuits start operations at different times, the current consumption due to the operation of the source data buffers 130 circuits is appropriately distributed so that the above-described peak current reduction effect can be obtained.

Figure 6:
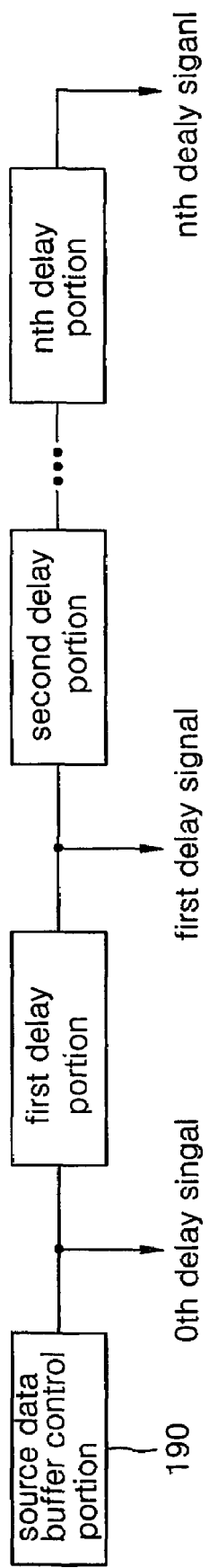
FIG. 6 is a view showing a method of generating a delayed enable signal.

It is easy to generate the enable signals used in the preferred embodiments of the present invention. The enable signals by which the output signals of the respective delay portions have appropriate time delays are generated by connecting several delay portions in series to the $0^{th}$ delay signal that is an output signal generated from the source data buffer control portion 190 as shown in FIG. 6. These signals connected to the source data buffer enable signals shown in FIGS. 2 through 4 in a one-to-one correspondence.

The circuit generating a delay enable signal can be set up by using passive devices such as inverters, resistors and capacitors. Since the method of generating a delay signal is well known and is not the characteristic feature of the present invention, a detailed description thereof will be omitted.

Figure 5:
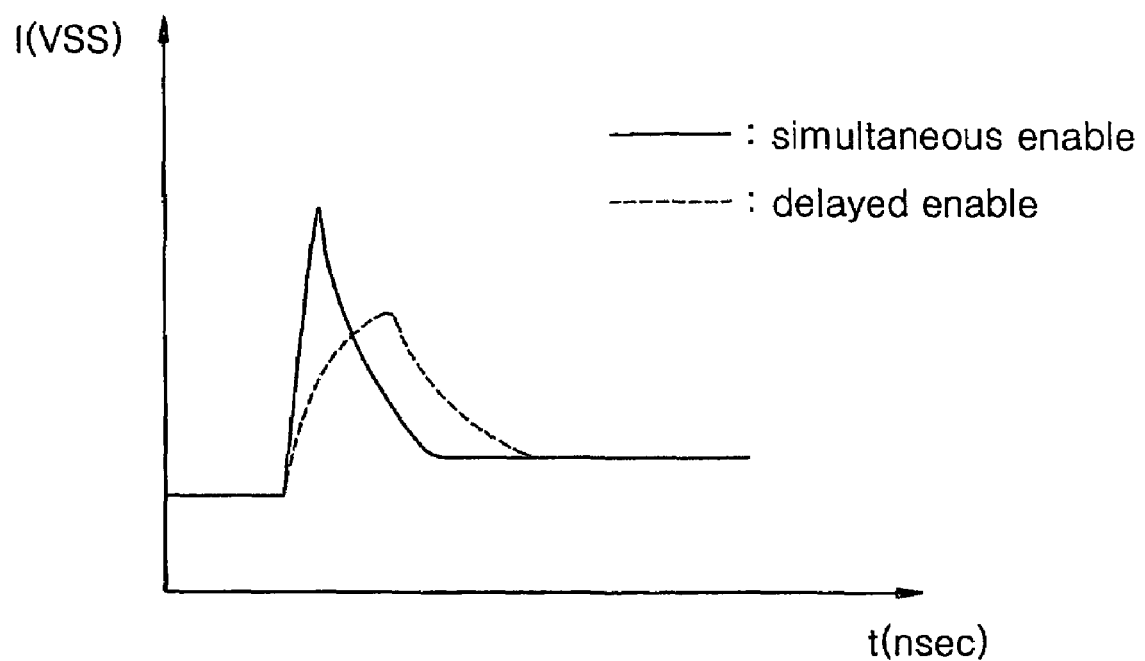
FIG. 5 is a graph showing the comparison result of simulation of source data buffer circuits having a simultaneous enable signal and a delayed enable signal.

To verify the effect of the present invention, a case in which the delay enable circuit operation and the source data buffer of the present invention shown in FIG. 3 are enabled together is compared and circuit simulated. A current waveform showing the result of the comparison and circuit simulation is shown in FIG. 5. In the case of circuit operation of the present invention, it can be seen that the peak current value is reduced by 40% compared to a case in which the source data buffers are enabled together.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

As described above, in the operation of the source data buffer circuits according to the present invention, since consumption of current is distributed when the source data buffer circuits are enabled and start operation, the current value at a peak value is reduced.

According to the circuit operation method of the present invention, as the current at the peak value decreases, the ground voltage of the circuit becomes stable and accordingly the operation of the circuit and a signal waveform are stable.

Furthermore, since the circuit ground voltage is stable, a reliable display panel driving system is provided.

The invention claimed is:

1. A memory device for driving a display panel comprising:
arrays of memory cells storing binary information;
pairs of bit line-bit bar line connected to the memory cells;
first transfer gates connected to one end of the bit line-bit bar line pairs and switched by first signals to write the binary information into the memory cells;
second transfer gates connected to the other end of bit line-bit bar line pairs and switched to read out the binary information stored in the memory cells; and
data buffers to receive the read-out binary information of the memory cells from the second transfer gates, by the switching operation of the second transfer gates and to store the read-out binary information,
wherein the second transfer gates are switched by second signals which are derived from a single enable signal and divided into several groups, each group of the second signals having a different time delay,
wherein the second signals of each group switch the second transfer gates of a corresponding group to allow the binary information to be transferred from the memory cells to the data buffers through the switched second transfer gates of the corresponding group.

2. The memory device of claim 1, wherein the different time delay is performed by a circuit including a logic circuit having an inversing function.

3. The memory device of claim 1, wherein the different time delay is performed by a capacitor, a resistor, or a combination of the capacitor and the resistor.

4. The memory device of claim 1, wherein the first transfer gates are switched by the column address as being grouped by unit of $2^n$, wherein n is a positive integer including 0.

5. The memory device of claim 1, wherein the time delay is a signal generated by a plurality of delay portions which are connected in series.

6. A memory device for driving a display panel comprising:
a memory cell array storing binary information;
pairs of bit line-bit bar line connected to the memory cells;
first transfer gates connected to one end of the bit line-bit bar line pairs and switched by first signals to write the binary information into the memory cells;
second transfer gates connected to the other end of bit line-bit bar line pairs and switched to read out the binary information stored in the memory cells; and
data buffers to receive the read-out binary information of the memory cells from the second transfer gates, by the switching operation of the second transfer gates and to store the read-out binary information,
wherein the data buffers are enabled by second signals which are derived from a single enable signal and divided into several groups, each group of the second signals having a different time delay,
wherein the second signals of each group enable the data buffers of a corresponding group to allow the binary information to be transferred from the memory cells to the enabled data buffers of the corresponding group.

7. The memory device of claim 6, wherein the different time delay is performed by a circuit including a logic circuit having an inversing function.

8. The memory device of claim 6, wherein the different time delay is performed by a capacitor, a resistor, or a combination of the capacitor and the resistor.

9. The memory device of claim 6, wherein the first transfer gates are switched by the column address as being grouped by unit of $2^n$, wherein n is a positive integer including 0.

10. The memory device of claim 6, wherein the time delay is a signal generated by a plurality of delay portions which are connected in series.

11. A memory device for driving a display panel comprising:
a memory cell array storing binary information;
pairs of bit line-bit bar line connected to the memory cells;
first transfer gates connected to one end of the bit line-bit bar line pairs and switched by first signals to write the binary information into the memory cells;
second transfer gates connected to the other end of bit line-bit bar line pairs and switched to read out the binary information stored in the memory cells; and
data buffers to receive the read-out binary information of the memory cells from the second transfer gates, by the switching operation of the second transfer gates and to store the read-out binary information,
wherein the data buffers are enabled and the second transfer gates are switched by second signals which are derived from a single enable signal and divided into several groups, each group of the second signals having a different time delay,
wherein the second signals of each group switch the second transfer gates of a corresponding group and enable the data buffers of a corresponding group to allow the binary information to be transferred from the memory cells through the switched second transfer gates of the corresponding group to the enabled data buffers of the corresponding group.

12. The memory device of claim 11, wherein the different time delay is performed by a circuit including a logic circuit having an inversing function.

13. The memory device of claim 11, wherein the different time delay is performed by a capacitor, a resistor, or a combination of the capacitor and the resistor.

14. The memory device of claim 11, wherein the first transfer gates are switched by the column address as being grouped by unit of $2^n$, wherein n is a positive integer including 0.

15. The memory device of claim 11, wherein the time delay is a signal generated by a plurality of delay portions which are connected in series.

16. A method of driving a memory device for driving a display panel, wherein data is written on a memory cell array through first transfer gates which are connected to one end of bit lines and partially selected and switched by first signals, the method comprising:

performing a switching operation of second transfer gates connected to the other end of the bit lines to read the written data on the memory cell array; and transferring the written data from the second transfer gates to data buffers by the switching operation of the second transfer gates connected to the other end of the bit lines, and wherein the second transfer gates are switched by second signals which are divided into groups, each group of the second signals having a different time delay, wherein the second signals of each group switch the second transfer gates of a corresponding group to allow the data to be transferred from the memory cell array to the data buffers through the switched second transfer gates of the corresponding group.

17. The method of claim 16, wherein the different time delay is performed by a circuit including a logic circuit having an inversing function.

18. The method of claim 16, wherein the different time delay is performed by a capacitor, a resistor, or a combination of the capacitor and the resistor.

19. The method of claim 16, wherein the first transfer gates are switched by the column address as being grouped by unit of $2^n$, wherein n is a positive integer including 0.

20. The method of claim 16, wherein the time delay is a signal generated by a plurality of delay portions which are connected in series.

21. A method of driving a memory device for driving a display panel, wherein data is written on a memory cell array through first transfer gates which are connected to one end of bit lines and partially selected and switched by first signals, the method comprising:

performing a switching operation of second transfer gates connected to the other end of the bit lines to read the written data on the memory cell array; and transferring the written data to data buffers from the second transfer gates, by performing the switching operation of the second transfer gates connected to the other end of the bit lines, and wherein the data buffers are enabled by second signals which are divided into groups, each group of the second signals having a different time delay, wherein the second signals of each group enable the data buffers of a corresponding group to allow the data to be transferred from the memory cell array to the enabled data buffers of the corresponding group.

22. The method of claim 21, wherein the different time delay is performed by a circuit including a logic circuit having an inversing function.

23. The method of claim 21, wherein the different time delay is performed by a capacitor, a resistor, or a combination of the capacitor and the resistor.

24. The method of claim 21, wherein the first transfer gates are switched by the column address as being grouped by unit of $2^n$, wherein n is a positive integer including 0.

25. The method of claim 21, wherein the time delay is a signal generated by a plurality of delay portions which are connected in series.

26. A method of driving a memory device for driving a display panel, wherein data is written on a memory cell array through first transfer gates which are connected to one end of bit lines and partially selected and switched by first signals, the method comprising:

performing a switching operation of second transfer gates connected to the other end of the bit lines to read the written data on the memory cell array; and transferring the written data to data buffers by performing the switching operation of the second transfer gates connected to the other end of the bit lines, and wherein the second transfer gates and the data buffers are simultaneously switched and enabled, respectively, by second signals which are divided into groups, each group of the second signals having a different time delay, wherein the second signals of each group switch the second transfer gates of a corresponding group and enable the data buffers of a corresponding group to allow the data to be transferred from the memory cell array through the switched second transfer gates of the corresponding group to the enabled data buffers of the corresponding group.

27. The method of claim 26, wherein the different time delay is performed by a circuit including a logic circuit having an inversing function.

28. The method of claim 26, wherein the different time delay is performed by a capacitor, a resistor, or a combination of the capacitor and the resistor.

29. The method of claim 26, wherein the first transfer gates are switched by the column address as being grouped by unit of $2^n$, wherein n is a positive integer including 0.

30. The method of claim 26, wherein the time delay is a signal generated by a plurality of delay portions which are connected in series.

* * * * *